United States Patent
Kohara

Patent Number: 5,257,814
Date of Patent: Nov. 2, 1993

[54] SUSPENSION CONTROLLER
[75] Inventor: Takao Kohara, Inagi, Japan
[73] Assignee: Tokico Ltd., Kanagawa, Japan
[21] Appl. No.: 810,293
[22] Filed: Dec. 19, 1991
[30] Foreign Application Priority Data Dec. 20, 1990 [JP] Japan .................................. 2-412488

[51] Int. Cl.[5] ............................................. B60G 11/26
[52] U.S. Cl. ................................ 280/707; 280/714; 280/772; 280/DIG. 1
[58] Field of Search ............... 280/787, 772, 711, 714, 280/DIG. 1

[56] References Cited

U.S. PATENT DOCUMENTS

| | | | |
|---|---|---|---|
| 5,033,770 | 7/1991 | Kamimura et al. | 280/707 |
| 5,060,968 | 10/1991 | Edahiro et al. | 280/707 |
| 5,060,969 | 10/1991 | Kamimura et al. | 280/707 |
| 5,060,970 | 10/1991 | Kamimura et al. | 280/707 |
| 5,062,659 | 11/1991 | Edahiro et al. | 280/711 |

OTHER PUBLICATIONS

"Development of a Hydraulic Active Suspension by Nissan", a summary of a scientific lecture given during the Oct. 18, 1989 meeting of the Society of Automotive Engineers of Japan, Inc. (published Oct. 6, 1989).

Primary Examiner—Kenneth R. Rice
Attorney, Agent, or Firm—Wenderoth, Lind & Ponack

[57] ABSTRACT

A suspension controller includes a controller that actuates devices for charging and discharging a pressure fluid into and from front and rear wheel-side cylinders. The controller has first-order lag circuits including first-order lag elements with different time constants. In the early stage of a steering operation, the rear wheel-side cylinders carry a higher travelling load than that shared by the front wheel-side cylinders on the basis of transverse acceleration data detected with a transverse acceleration sensor, so that excellent vehicle turning characteristics can be obtained. After a predetermined time has elapsed, the front wheel-side cylinders are also subjected to control based on the transverse acceleration data, so that the load is shared between the front and rear wheel-side cylinders in a well-balanced manner. Thus, excellent convergence is obtained.

10 Claims, 8 Drawing Sheets

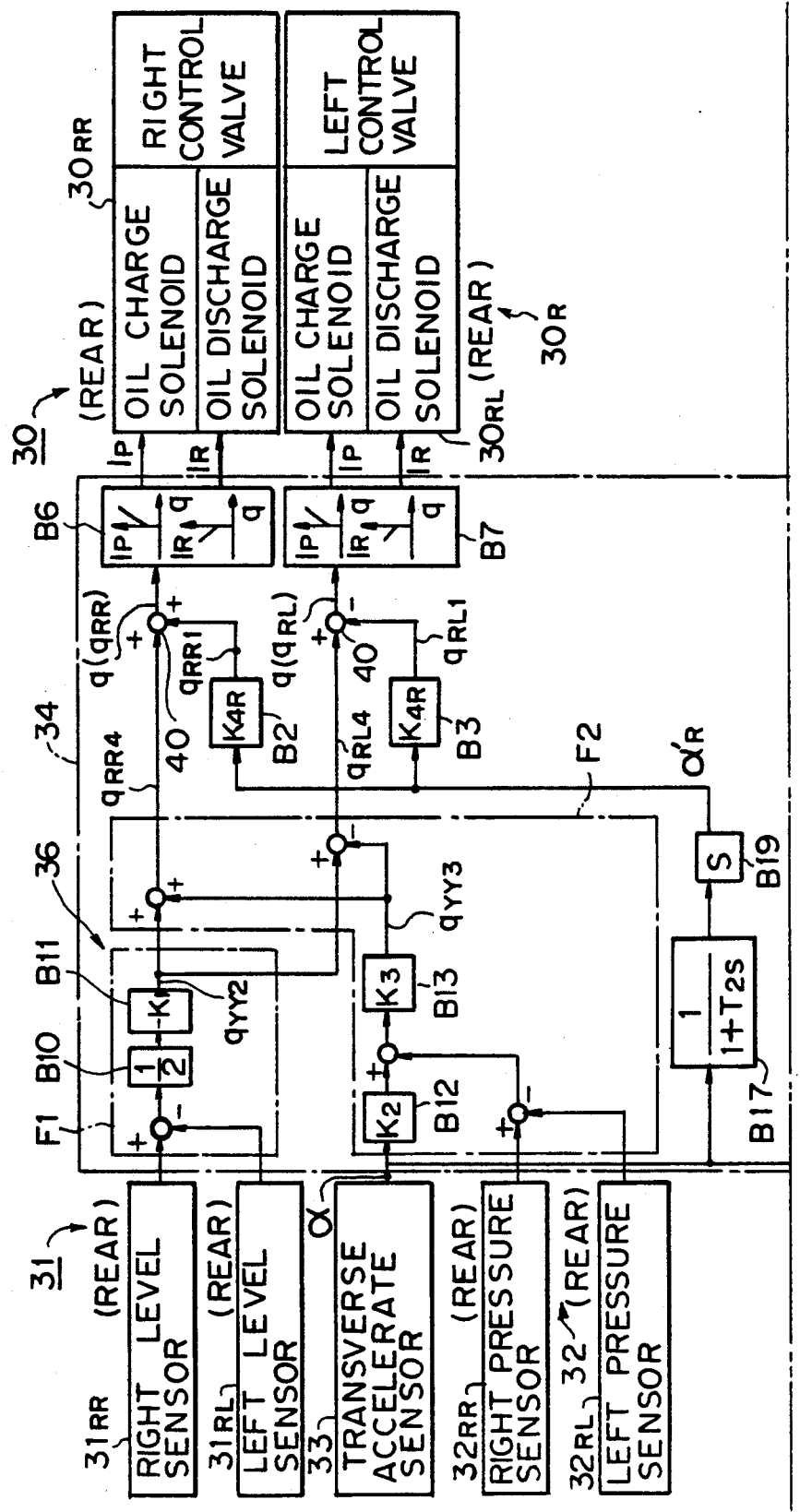

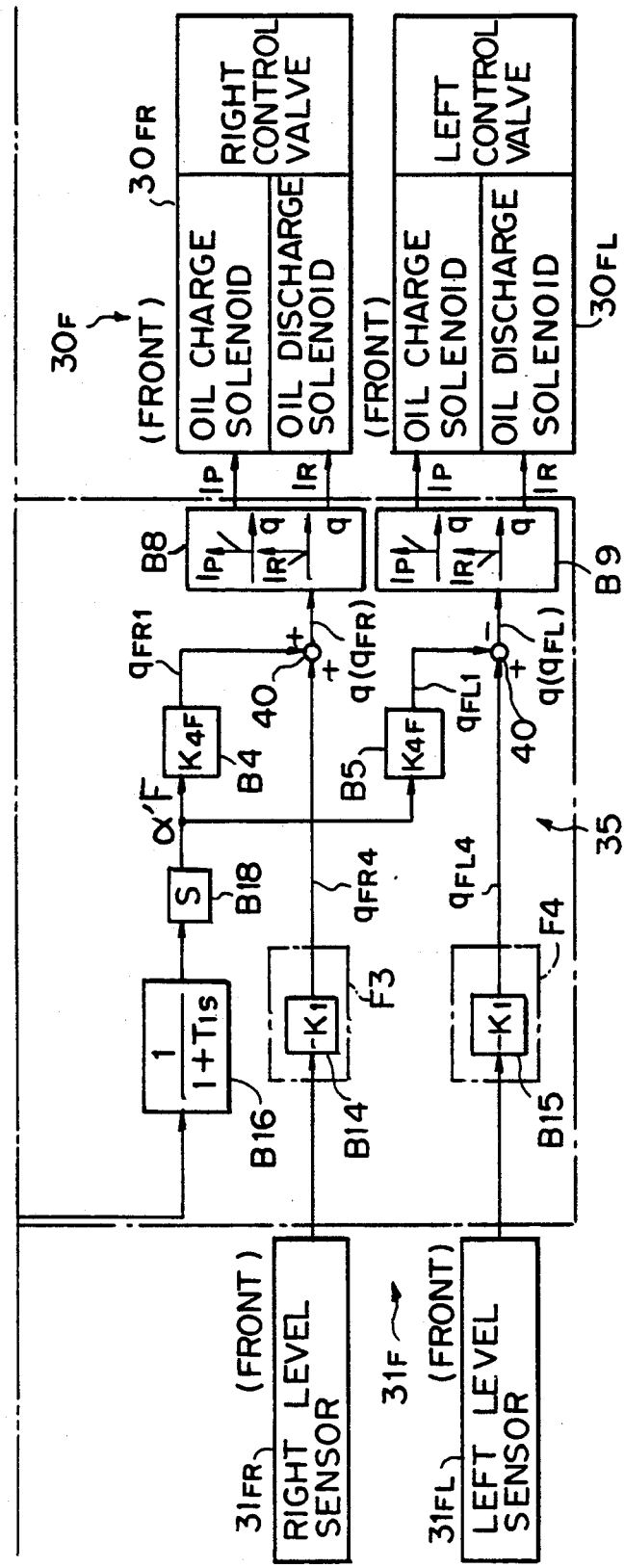

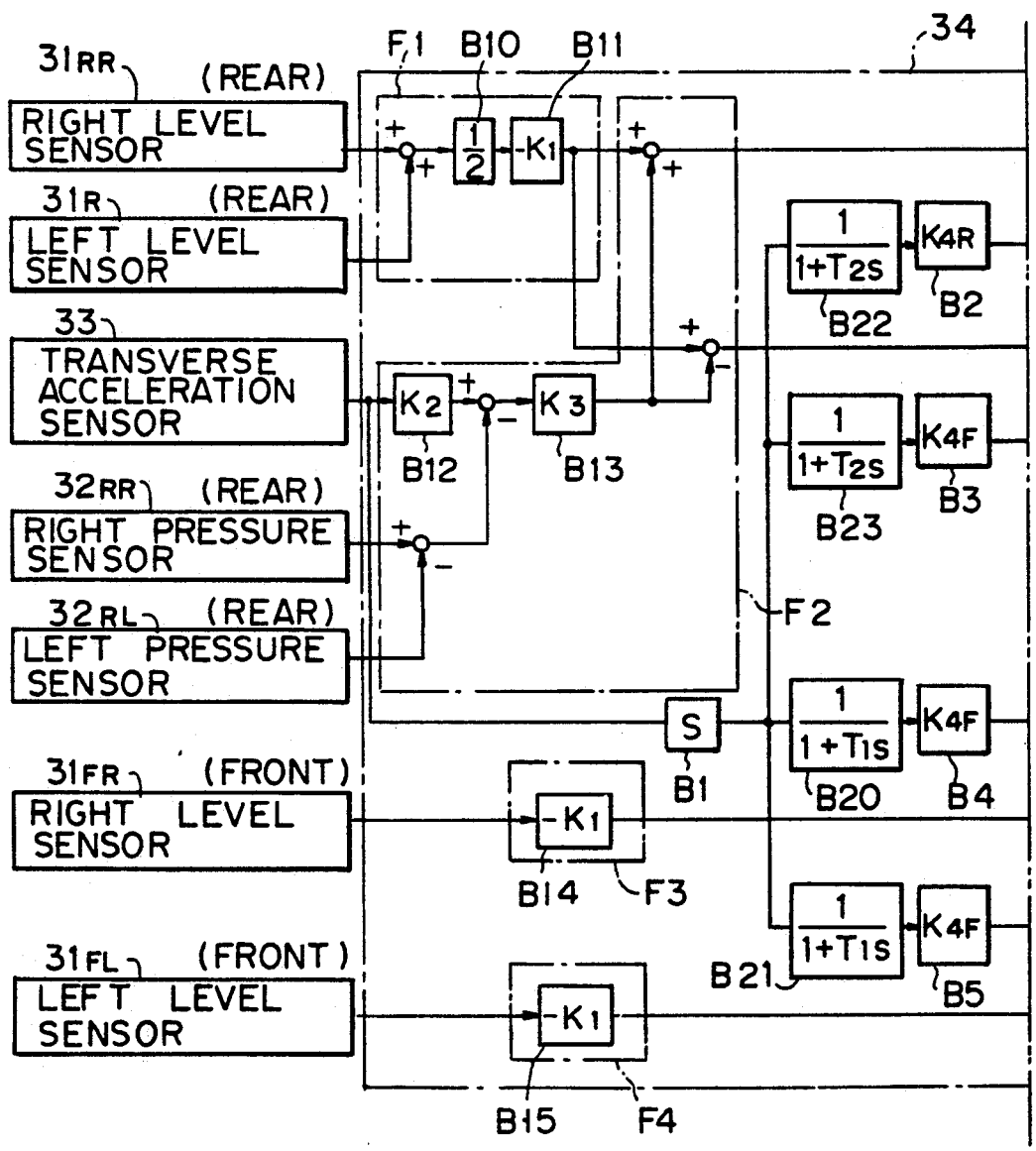

5,257,814

SUSPENSION CONTROLLER

BACKGROUND OF THE INVENTION

1. Field of the Invention

The present invention relates to a suspension controller for use in a vehicle, for example, an automobile.

2. Description of the Prior Art

Suspension controllers have heretofore been employed to effect attitude control of an automobile so as to improve steering stability or other running performance characteristics. One example of the suspension controllers is disclosed in Japanese Patent Application No. 01-67942 (1989). In this prior art, as shown schematically in FIGS. 1 and 2, transverse acceleration that acts on a vehicle body 2 is detected with a transverse acceleration sensor 1, and the detected transverse acceleration data is supplied to summing-up points 7 in a control means 6, where it is added to or subtracted from vehicle level data (detected with level sensors 4 respectively associated with four wheels 3, and pressure data (detected with pressure sensors 5) to calculate flow data for each wheel 3. Then, current data is calculated in a converter circuit 8 on the basis of each flow data. The current data thus obtained is output to a control valve 11 that is interposed between a cylinder 9 and a pump 10, which are associated with each of the four wheels 3, to control a pressure fluid supplied to each cylinder 9. In this way, the pressure balance among the cylinders 9 is changed to adjust the load distribution to the wheels 3, thereby suppressing the change in attitude of the vehicle, and thus improving the running performance.

In vehicles, excellent vehicle turning characteristics are particularly required in the early stage of a steering operation. To meet such requirements, the above-described conventional suspension controller is designed so that a travelling load that is shared by the cylinders on the rear wheel side is made higher than that on the front wheel side, for example, by making the gain by which the transverse acceleration data input to a proportional flow control valve on the rear wheel side is multiplied larger than the gain by which the transverse acceleration data input to a proportional flow control valve on the front wheel side is multiplied, thus obtaining excellent vehicle turning characteristics. In this case, however, over-steering may be induced, which is likely to be dangerous, and convergence (stability) deteriorates. If the load that is shared by the cylinders on the front wheel side is made higher than that on the rear wheel side, convergence is improved, but under-steering results, and the vehicle turning characteristics deteriorate.

SUMMARY OF THE INVENTION

In view of the above-described problems of the prior art, it is an object of the present invention to provide a suspension controller for a vehicle which is designed so that excellent vehicle turning characteristics and superior convergence are obtained.

To attain the above-described object, the present invention provides a suspension controller for a vehicle comprising: cylinders each interposed between a member provided on a vehicle body and a member provided on each wheel, the level of the vehicle being established by the amount of a pressure fluid therein means for charging and discharging the pressure fluid into and from each of the cylinders; a transverse acceleration sensor for detecting transverse acceleration acting on the vehicle when making a turn; and control means that creates signals for controlling the front wheel-side charging and discharging means and the rear wheel-side charging and discharging means, respectively, on the basis of the transverse acceleration detected with the transverse acceleration sensor and outputs the control signals to the front wheel-side charging and discharging means and the rear wheel-side charging and discharging means with a time difference therebetween.

In one embodiment of the present invention, the control means outputs the control signal for the front wheel-side charging and discharging means with a delay with respect from when the control signal for the rear wheel-side charging and discharging means has been output.

By virtue of the above-described arrangement, when a steering operation is initiated, a control signal for the front wheel-side charging and discharging means is output subject to a delay with respect to the control signal for the rear wheel-side charging and discharging means, thereby supplying the rear wheel-side cylinders with pressure fluid in advance of the front wheel-side cylinders in the early stages of the steering operation, whereby the travelling load borne by the rear wheel-side cylinders is made higher than that borne by the front wheel-side cylinders. After a predetermined time has elapsed, the front wheel-side cylinders are supplied with pressure fluid to increase the travelling load borne by them.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which:

FIGS. 3A and 3B are block diagrams of the conventional suspension controller;

FIGS. 3A and 3B are block diagrams of one embodiment of the suspension controller according to the present invention;

FIGS. 5A and 5B are block diagrams of another embodiment of the suspension controller according to the present invention.

DETAILED DESCRIPTION OF THE PREFERRED EMBODIMENTS

Figure 1:
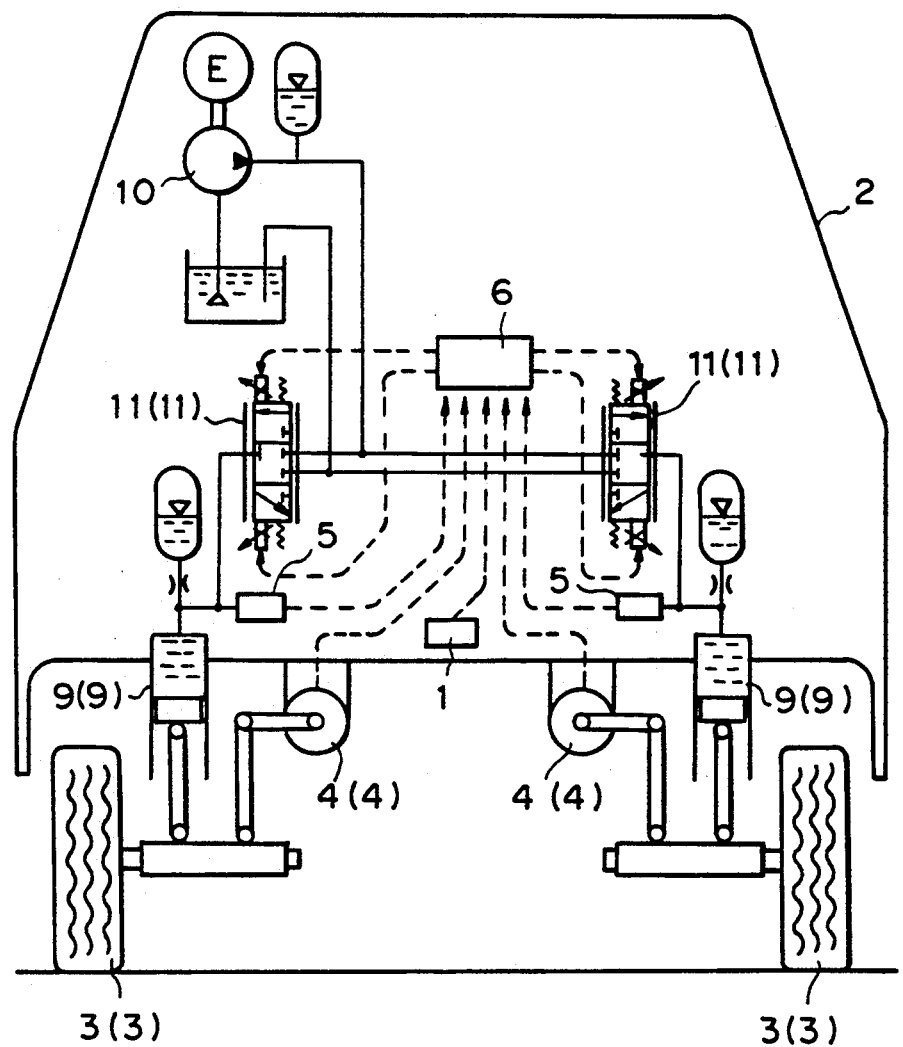
FIG. 1 is a rear view schematically showing a vehicle employing a conventional suspension controller.
Figure 2A:
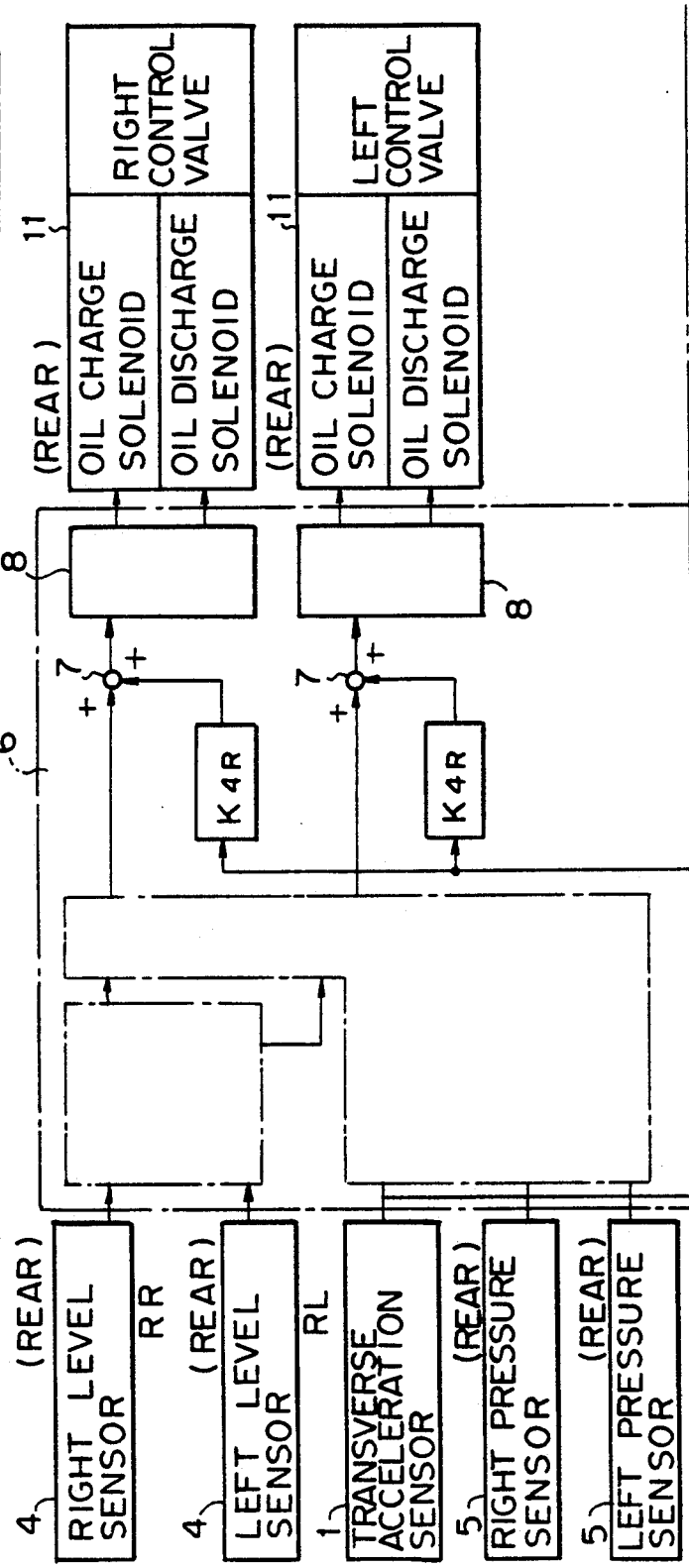
Figure 2B:
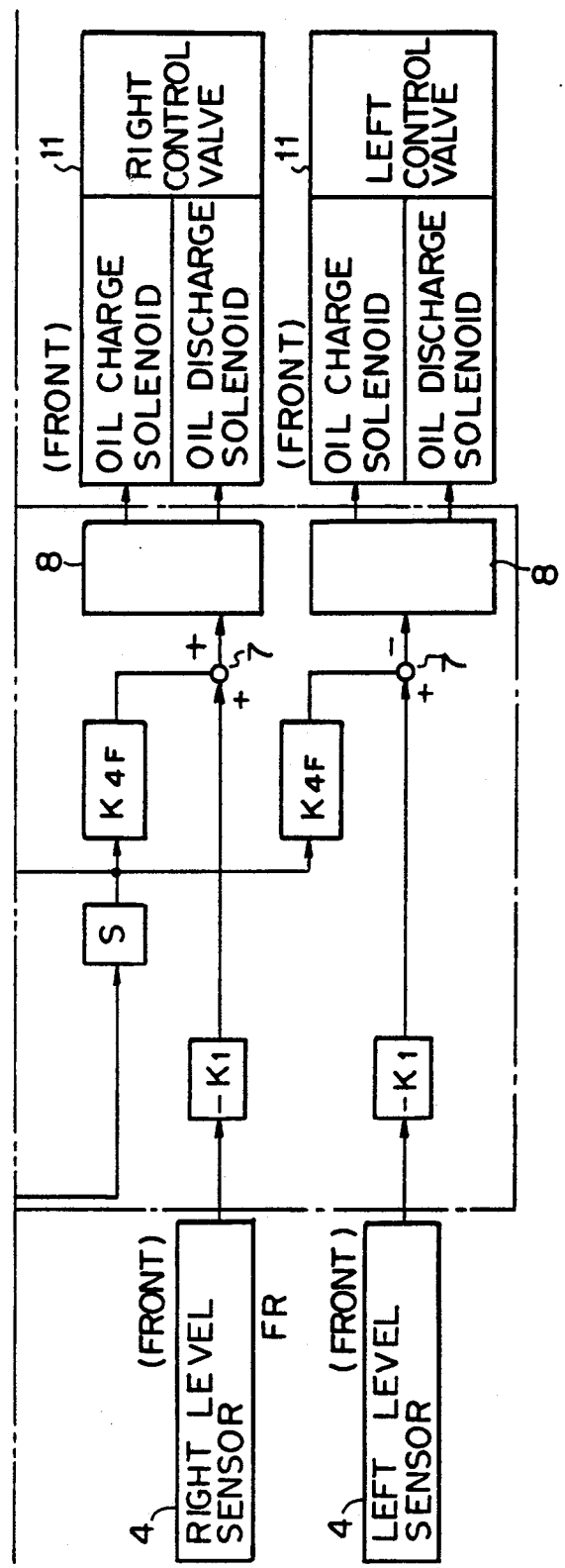
Figure 4:
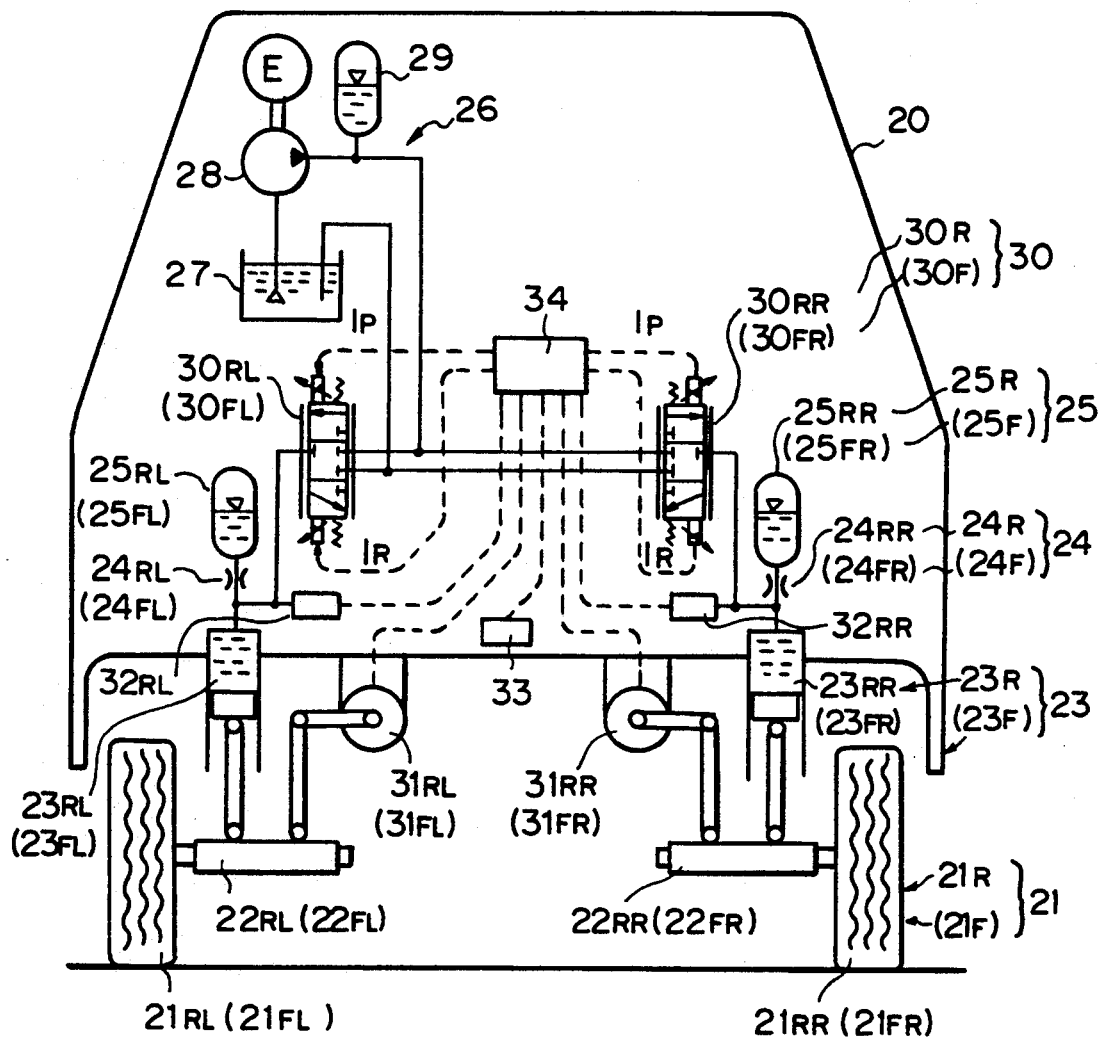
FIG. 4 is a rear view schematically showing a vehicle employing the suspension controller of the present invention.

One embodiment of the present invention will be described below with reference to FIGS. 3A, 3B and 4. A vehicle to which the present invention is applied has a vehicle body 20 and four wheels 21 (for the sake of convenience, the front wheels are denoted by $21_F$, the rear wheels by $21_R$, the left and right front wheels by $21_{FL}$ and $21_{FR}$, and the left and right rear wheels by $21_{RL}$ and $21_{RR}$; the same rule applies to other members and signals described below), the wheels 21 being attached to respective axles 22 ($22_{FL}$, $22_{FR}$, $22_{RL}$ and $22_{RR}$). Between the vehicle body 20 and the axles 22 are interposed level-control cylinders 23 ($23_{FL}$, $23_{FR}$, $23_{RL}$ and $23_{RR}$), the insides of which communicate with accumulators 25 ($25_{FL}$, $25_{FR}$, $25_{RL}$ and $25_{RR}$), which serve as spring elements, through restrictors 24 ($24_{FL}$, $24_{FR}$, $24_{RL}$ and $24_{RR}$), respectively.

Each cylinder 23 is connected to a charging and discharging mechanism 26 that effects charge and discharge of a pressure fluid, for example, oil. The charging and discharging mechanism 26 comprises a reservoir tank 27 that stores the pressure fluid, a pump 28 that delivers the fluid from the reservoir tank 27, a main accumulator 29 that maintains the pressure of the fluid delivered from the pump 28 at a predetermined level, and proportional flow control valves (charging and discharging means) 30 ($30_{FL}$, $30_{FR}$, $30_{RL}$ and $30_{RR}$) which are disposed in respective lines that connect the cylinders 23 ($23_{FL}$, $23_{FR}$, $23_{RL}$ and $23_{RR}$) and the pump 28. It should be noted that the charging and discharging mechanism 26 is provided with a pump operation control means (not shown) that controls the operation of the pump 28 so that the pressure at the accumulator side is always maintained at a predetermined level.

Between the vehicle body 20 and the axles 22 ($22_{FL}$, $22_{FR}$, $22_{RL}$ and $22_{RR}$) are interposed level sensors 31 ($31_{FL}$, $31_{FR}$, $31_{RL}$ and $31_{RR}$) to detect the level of the vehicle at the position of each wheel 21 from the relative displacement between the vehicle body 20 and the wheel 21.

Pressure sensors 32 ($32_{RL}$ and $32_{RR}$) are connected to intermediate portions of lines that connect the rear wheel-side cylinders $23_{RL}$ and $23_{RR}$ and the rear wheel-side proportional flow control valves $30_{RL}$ and $30_{RR}$, respectively, to detect the levels of pressure of the pressure fluid inside the cylinders $23_{RL}$ and $23_{RR}$.

The vehicle body 20 is equipped with a transverse acceleration sensor 33 that detects transverse acceleration acting on the vehicle body 20 during turning.

A control means 34 is operatively connected to the proportional flow control valves 30 ($30_{FL}$, $30_{FR}$, $30_{RL}$ and $30_{RR}$), the level sensors 31 ($31_{FL}$, $31_{FR}$, $31_{RL}$ and $31_{RR}$), the pressure sensors 32 ($32_{RL}$ and $32_{RR}$) and the transverse acceleration sensor 33. The control means 34, which comprises a roll control means 35 and a differential pressure control means 36, executes a preset control program. More specifically, the control means 34 executes arithmetic processing in accordance with data input from each of the above-described sensors and controls the charging and discharging mechanism 26 on the basis of the results of the processing.

In the roll control means 35, a signal representative of transverse acceleration $\alpha$ detected with the transverse acceleration sensor 33 is input to first-order lag circuits B16 and B17, and the output data from these circuits B16 and B17 are differentiated in differentiation circuits B18 and B19 to obtain a front wheel-side transverse acceleration change rate $\alpha'_F$ and a rear wheel-side transverse acceleration change rate $\alpha'_R$, respectively. The rear wheel-side transverse acceleration change rate $\alpha'_R$ is multiplied by gains $K_{4R}$ in circuits B2 and B3, while the front wheel-side transverse acceleration change rate $\alpha'_F$ is multiplied by gains $K_{4F}$ in circuits B4 and B5, to output signals representative of instantaneous flow rates $q_{YY1}$ (YY represents FL, FR, RL and RR) from the circuits B2 to B5. These signals are processed at summing-up points 40 to obtain instantaneous flow rates q ($q_{FL}$, $q_{FR}$, $q_{RL}$ and $q_{RR}$), which are then input to converter circuits B6 to B9, respectively. The first-order lag circuits B16 and B17 are arranged such that the time constants of the respective first-order lag elements are $T_1$ and $T_2$ ($T_1 > T_2$), thereby making it possible to cope with different controlled variables required for the front and rear wheel-side cylinders $23_F$ and $23_R$ in a transient state caused by steering. More specifically, by setting the time constant $T_1$ to be larger than the time constant $T_2$, the pressure in the front wheel-side cylinders $23_F$ is controlled with a predetermined time lag after the pressure in the rear wheel-side cylinders $23_R$ is controlled, as described later.

The instantaneous flow rates q ($q_{FL}$, $q_{FR}$, $q_{RL}$ and $q_{RR}$), are values used to attain charge-discharge quantities (target charge-discharge quantities) of pressure fluid required for the cylinders 23 ($23_{FL}$, $23_{FR}$, $23_{RL}$ and $23_{RR}$) to effect attitude control of the vehicle within a predetermined time. The signals representative of the instantaneous flow rates q ($q_{FL}$, $q_{FR}$, $q_{RL}$ and $q_{RR}$) are input to the converter circuits B6 to B9, where data $I_P$ and $I_R$ about currents which are to be supplied to the proportional flow control valves 30 ($30_{FL}$, $30_{FR}$, $30_{RL}$ and $30_{RR}$) to attain the target charge-discharge quantities are obtained in accordance with the characteristics of the proportional flow control valves 30, and currents corresponding to the current data $I_P$ and $I_R$ are supplied to the proportional flow control valves 30, respectively, (the graphs in the circuits B6 to B9 show instantaneous flow rate-current characteristics of the proportional flow control valves 30).

Next, the differential pressure control means 36 will be described. The differential pressure control means 36 comprises a level control section F1 and a differential pressure control section F2.

The level control section F/adds signals from the rear wheel-side right and left level sensors $31_{RR}$ and $31_{RL}$, and the resulting sum is multiplied by ½ in a circuit B10 to obtain a mean vehicle level at the left and right wheels. Then, the signal from the circuit B10 is multiplied by a gain $-K_1$ in a circuit B11 to obtain charge-discharge quantities of pressure fluid charged into or discharged from the cylinders 23 ($23_{FL}$, $23_{FR}$, $23_{RL}$ and $23_{RR}$) so that the mean vehicle level coincides with the target level. The circuit B11 outputs a signal representative of an instantaneous flow rate $q_{YY2}$ (YY represents RL and RR) required to make the mean vehicle level coincident with the target level.

In the differential pressure control section F2, pressure data that is detected by the pressure sensor $32_{RR}$ is added to a signal obtained by attaching a negative sign to pressure data detected by the pressure sensor $32_{RL}$, thereby outputting a signal representative of an actual pressure difference between the rear wheel-side left and right cylinders $23_{RL}$ and $23_{RR}$. In addition, the signal representative of the transverse acceleration detected by the transverse acceleration sensor 33 is multiplied by a gain $K_2$ in a circuit B12 to obtain a target value for a differential pressure which is to be produced between the left and right cylinders $23_{RL}$ and $23_{RR}$. This target value is added to a signal obtained by attaching a negative sign to the actual pressure difference to output a differential pressure deviation signal. The differential pressure deviation signal is multiplied by a gain $K_3$ in a circuit B13 to obtain quantities of pressure fluid which are to be charged into or discharged from the left and right cylinders $23_{RL}$ and $23_{RR}$ in order to make the pressure difference therebetween coincident with the differential pressure target value. The circuit B13 outputs a signal representative of an instantaneous flow rate $q_{YY3}$ (YY represents RL and RR) required to make the actual pressure difference coincident with the differential pressure target value.

The signal representative of the charge-discharge quantity ($q_{YY2}$) output from the circuit B11 and the signal representative of the charge-discharge quantity ($q_{YY3}$) output from the circuit B13 are added together to obtain sum data $q_{RR4}$, which is then added to the instantaneous flow rate $q_{RR1}$ at the summing-up point 40, thereby obtaining the above-described instantaneous flow rate $q_{RR}$. In addition, the signal representative of the charge-discharge quantity ($q_{YY2}$) output from the circuit B11 is added to a signal obtained by attaching a negative sign to the charge-discharge quantity ($q_{YY3}$) output from the circuit B13 to obtain sum data $q_{RL4}$, which is then added to the instantaneous flow rate $q_{RL1}$ at the summing-up point 40, thereby obtaining the above-described instantaneous flow rate $q_{RL}$. The signals representative of the instantaneous flow rates q ($q_{RR}$ and $q_{RL}$) synthesized to attain quantities of pressure fluid which are to be charged into or discharged from the cylinders $23_{RR}$ and $23_{RL}$ are output to the circuits B6 and B7 in order to maintain the mean vehicle level on the rear wheel side at the target level and constantly maintain the pressure difference between the rear wheel-side left and right cylinders $23_{RL}$ and $23_{RR}$ at a predetermined value based on by the transverse acceleration.

In the circuits B6 to B9, values for currents which are to be supplied to the proportional flow control valves 30 ($30_{FL}$, $30_{FR}$, $30_{RL}$ and $30_{RR}$) to attain the above-described charge-discharge quantity ($q_{YY1}$) are set in accordance with the characteristics of the proportional flow control valves 30, and currents are supplied to the proportional flow control valves 30 ($30_{FL}$, $30_{FR}$, $30_{RL}$ and $30_{RR}$) on the basis of the current data $I_P$ and $I_R$.

Reference symbols F3 and F4 in FIG. 3B denote level control sections for the front wheels, which are supplied with vehicle level data from the front wheel-side level sensors $31_{FR}$ and $31_{FL}$. The level data are multiplied by a gain $-K_1$ in circuits B14 and B15 to obtain data $q_{FR4}$ and $q_{FL4}$, respectively. The data $q_{FR4}$ is added to the above-described instantaneous flow rate $q_{FR1}$ at the summing-up point 40, while the data $q_{FL4}$ is added to a signal obtained by attaching a negative sign to the instantaneous flow rate $q_{FL1}$ at the summing-up point 40, thereby calculating the instantaneous flow rates $q_{FR}$ and $q_{FL}$ corresponding to the charge-discharge quantities of pressure fluid needed to attain the target vehicle level, the instantaneous flow rates $q_{FR}$ and $q_{FL}$ then being output to the circuits B8 and B9, respectively. Thus, feedback control is effected such that the vehicle level at the front wheels is corrected to attain the target level.

The operation of the suspension controller having the above-described arrangement will be explained below.

If steering is initiated when the vehicle is running in a normal state, force acts on the vehicle body 20 in such a manner as to induce rolling. On this occasion, suspension control is effected on the basis of the transverse acceleration.

More specifically, charge-discharge control is effected for the rear and front wheel-side cylinders $23_R$ and $23_F$ with a predetermined time lag by the first-order lag circuits B16 and B17 on the basis of the transverse acceleration data detected with the transverse acceleration sensor 33, as has been described in connection with the block diagram of FIGS. 3A and 3B. In the early stage of the steering operation, since the time constant $T_1$ of the first-order lag circuit B16 for the front wheel-side cylinders 23F is larger than the time constant $T_2$ for the rear wheel side, the rear wheel-side cylinders $23_R$ are supplied with high pressure in advance of the front wheel-side cylinders $23_F$, so that the rear wheel-side cylinders $23_R$ carry a higher travelling load than that shared by the front wheel-side cylinders $23_F$. Thus, excellent vehicle turning characteristics can be obtained in the early stage of the steering operation. After a predetermined time has elapsed, the front wheel-side cylinders $23_F$ are also subjected to control based on the transverse acceleration data. As a result, the load shared by the front wheel-side cylinders $23_F$ increases gradually, so that the load is shared between the front and rear wheel-side cylinders $23_F$ and $23_R$ in a well-balanced manner. Thus, excellent convergence is obtained.

In this embodiment, excellent vehicle turning characteristics and superior convergence are achieved at the time of steering by making use of a single transverse acceleration sensor employed in the conventional suspension controller. There is therefore no substantial increase in the cost associated with the apparatus as compared to the conventional controller.

Figure 5B:
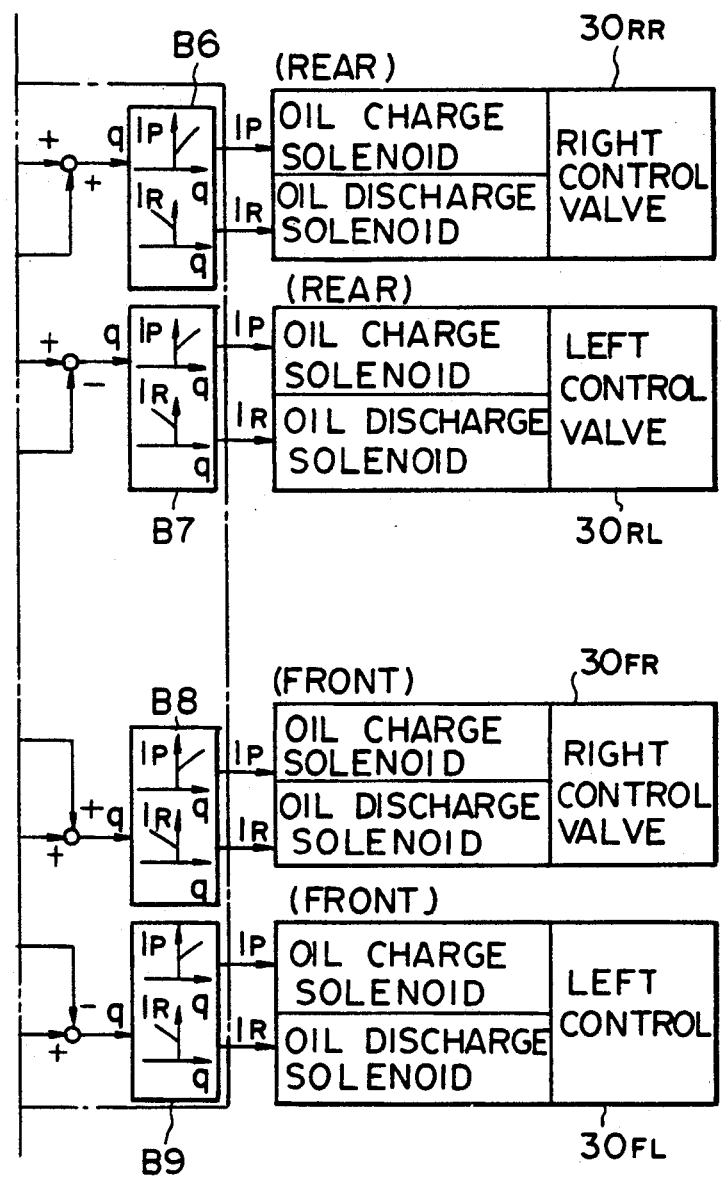

Although in the foregoing embodiment the present invention has been described by way of one example in which the transverse acceleration data is arithmetically processed by use of the first-order lag elements in the first-order lag circuits B16 and B17 and the results of the arithmetic processing are differentiated in the differentiation circuits B18 and B19, it should be noted that the present invention is not necessarily limited thereto and that the processing order may be inverted, that is, the arrangement may be such that the transverse acceleration data is first differentiated in a differentiation circuit B1 and then arithmetically processed by first-order lag elements in first-order lag circuits B20 to B23, as shown exemplarily in FIGS. 5A and 5B.

Although in the foregoing embodiment the first-order lag circuits B16 and B17 are realized in the form of control software, it should be noted that the present invention is not necessarily limited thereto and that these circuits may be constituted by, for example, capacitors and resistors, as a matter of course.

Although in the foregoing embodiment first-order lag elements are employed to output control signals to the front and rear wheel sides with a time difference, it should be noted that the present invention is not necessarily limited thereto and that second-order lag elements or other means may, of course, be employed as long as control signals for the front and rear wheel sides are output with a time difference.

Although in the foregoing embodiment the transverse acceleration sensor 33 is employed as a transverse acceleration detecting means, it should be noted that the present invention is not necessarily limited thereto and that a vehicle speed sensor and a steering angle sensor may be emplyed in conjunction with each other, such that transverse accelatation is obtained from the mutual relationship between the speed signal output from the speed sensor and the steering angle signal output from the steering angle sensor.

According to the present invention, when a steering operation is initiated, the front wheel-side cylinders are supplied with the pressure fluid with a time lag after the rear wheel-side cylinders are supplied with the pressure fluid, so that the travelling load shared by the rear wheel-side cylinders is higher than that shared by the front wheel-side cylinders in the early stage of the steering operation, which provides excellent vehicle turning characteristics. After a predetermined time has elapsed, the travelling load shared by the front wheel-side cylinders increases gradually, so that the load is shared between the front and rear wheel-side cylinders in a well-balanced manner. Thus, excellent convergence is obtained.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A suspension controller of a vehicle having a vehicle body and front and rear wheels, said controller comprising:
    level-control cylinders each associated with a respective one of the front and rear wheels of the vehicle, and each of the level-control cylinders being interposed between the vehicle body and a member provided on the respective one of the front and rear wheels in such a manner that the level of the vehicle is established by the amount of pressurized fluid in the cylinders;
    front wheel-side charging and discharging means for selectively charging and discharging pressurized fluid into and from each said level-control cylinder associated with a respective front wheel of the vehicle;
    rear wheel-side charging and discharging means for selectively charging and discharging pressurized fluid into and from each said level-control cylinder associated with a respective rear wheel of the vehicle;
    transverse acceleration detecting means for detecting transverse acceleration acting on the vehicle while the vehicle is making a turn and for outputting a transverse acceleration signal representative of the transverse acceleration; and
    control means, operatively connected to said transverse acceleration detecting means and to said front and said rear wheel-side charging and discharging means, for receiving said transverse acceleration signal, for generating first and second control signals based on said transverse acceleration signal, for inputting said second control signal to the rear wheel-side charging and discharging means, and for inputting said first control signal to said front wheel-side charging and discharging means after the second control signal has been input to said rear wheel-side charging and discharging means such that each said level-control cylinder associated with a rear wheel of the vehicle is controlled by said rear wheel-side charging and discharging means on the basis of the transverse acceleration acting on the vehicle in advance of each said level-control cylinder associated with a front wheel of the vehicle being controlled by said front wheel-side charging and discharging means on the basis of the transverse acceleration.

2. A suspension controller according to claim 1, wherein said control means includes a first lag circuit which creates a time delay between when the transverse acceleration signal is received by the control means and said first control signal is output by the control means.

3. A suspension controller according to claim 2, wherein said control means includes a second lag circuit which creates a time delay between when the transverse acceleration signal is received by the control means and said second control signal is output by the control means, the time delay created by said first lag circuit being of a greater duration than the time delay created by said second lag circuit.

4. A suspension controller according to claim 2, wherein the time delay has the characteristics of a first-order lag.

5. A suspension controller according to claim 3, wherein the time delay created by said first and said second lag circuits each have the characteristics of a first-order lag.

6. A suspension controller of a vehicle having a vehicle body and front and rear wheels, said controller comprising:
    fluid-accommodating chambers each associated with a respective one of the front and rear wheels of the vehicle, and each of the fluid-accommodating chambers being interposed between the vehicle body and a member provided on the respective one of the front and rear wheels in such a manner that the level of the vehicle is established by the amount of pressurized fluid in the chambers;
    front wheel-side charging and discharging means for selectively charging and discharging pressurized fluid into and from each said fluid-accommodating chamber associated with a respective front wheel of the vehicle;
    rear wheel-side charging and discharge means for selectively charging and discharging pressurized fluid into and from each said fluid-accommodating chamber associated with a respective rear wheel of the vehicle;
    transverse acceleration detecting means for detecting transverse acceleration acting on the vehicle while the vehicle is making a turn and for outputting a transverse acceleration signal representative of the transverse acceleration; and
    control means, operatively connected to said transverse acceleration detecting means and to said front and said rear wheel-side charging and discharging means, for receiving said transverse acceleration signal, for generating first and second control signals based on said transverse acceleration signal, for inputting said second control signal to the rear wheel-side charging and discharging means, and for inputting said first control signal to said front wheel-side charging and discharging means after the second control signal has been input to said rear wheel-side charging and discharging means such that each said fluid-accommodating chamber associated with a rear wheel of the vehicle is acted on by said rear wheel-side charging and discharging means on the basis of the transverse acceleration acting on the vehicle in advance of each said fluid-accommodating chamber associated with a front wheel of the vehicle being acted on by said front wheel-side charging and discharging means on the basis of the transverse acceleration.

7. A suspension controller according to claim 6, wherein said control means includes a first lag circuit which creates a time delay between when the transverse acceleration signal is received by the control means and said first control signal is output by the control means.

8. A suspension controller according to claim 7, wherein said control means includes a second lag circuit which creates a time delay between when the transverse acceleration signal is received by the control means and said second control signal is output by the control means, the time delay created by said first lag circuit being of a greater duration than the time delay created by said second lag circuit.

9. A suspension controller according to claim 7, wherein the time delay has the characteristics of a first-order lag.

10. A suspension controller according to claim 8, wherein the time delay created by said first and said second lag circuits each have the characteristics of a first-order lag.

* * * * *